2,818,440
Patented Dec. 31, 1957

2,818,440
ADDITION OF METHYLOL GROUPS TO SATURATED HYDROCARBONS BY REACTION WITH FORMALDEHYDE AND ORGANIC PEROXIDES

Frederick F. Rust, Orinda, and Glenn Fuller, Berkeley, Calif., assignors to Shell Development Company, New York, N. Y., a corporation of Delaware No Drawing. Application November 4, 1955
Serial No. 545,115
4 Claims. (Cl. 260—617)

This invention relates to a method of adding a methylol group to certain saturated organic compounds. More specifically, it relates to a method of reacting certain saturated organic compounds with formaldehyde, or with compounds which liberate formaldehyde under reaction conditions, and with a peroxidic compound to introduce at least one methylol group into the saturated compound. It further relates to a method of introducing methyl side chains into saturated hydrocarbons by reacting the hydrocarbon with formaldehyde and a peroxidic compound to add at least one methylol group to the hydrocarbon and converting the resulting alcohol into the corresponding saturated hydrocarbon.

The present invention comprises a novel method whereby a

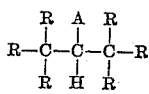

group, where each R represents hydrogen or a non-aromatic hydrocarbyl radical and A represents a hydrogen-, hydroxyl- or alkyl radical (i. e., —H, —OH, or —$C_nH_{2n+1}$) is converted into a

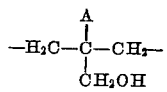

group in a simple manner by reacting a compound containing the former group with formaldehyde or with a compound which liberates formaldehyde under reaction conditions, in the presence of a peroxidic compound such as a dialkyl peroxide, at an elevated temperature to cause replacement of a hydrogen by a methylol group. Introduction of a methylol group into saturated compounds was previously known to be accomplished only by the Grignard reaction, which is a difficult and expensive method of operation, not ordinarily suitable for use on a commercial scale.

The process of the present invention is carried out by heating together the saturated compound, the aldehyde and the peroxide in liquid or vapor phase. In the preferred mode, the saturated compound is present in a liquid phase in which an organic peroxide is dissolved and the aldehyde is present in a separate, generally aqueous, liquid phase.

It is particularly advantageous to employ as the saturated compounds in the present invention paraffins having at least three carbon atoms per molecule, cycloparaffins and corresponding alcohols.

Suitable normal paraffins include normal propane, butane, pentane, hexane, heptane, nonane, dodecane, tetradecane, hexadecane (cetane), octadecane, heneicosane, nonacosane, pentatriacontane and the like. Branched paraffins can also be reacted in accordance with the present invention. Suitable compounds are, for example, 2-methylpentane, 3-methyl-hexane, 3-ethyl-hexane, 2,3-dimethyl-hexane, 2-2-4-trimethyl heptane, 2,14-dimethyl hexadecane, 2,9,16-trimethyl heptadecane, and the like. It is preferable that the paraffin compounds be normal or relatively slightly branched.

Among cycloparaffins suitable for use in the present invention are cyclobutane, cyclopentane, cyclohexane, cycloheptane, cyclooctane, and polycyclic cycloparaffins such as decalin. The cycloparaffins employed in the present invention may also have one or more alkyl group substituents. Among such compounds are, for example, methyl cyclohexane, methyl cyclopentane, ethyl cyclohexane and the like.

The above compounds can be employed in their pure state, but may also be employed in commercially available fractions such as petroleum oils, e. g. paraffinic naphthas, extracted kerosenes, etc., which may contain compounds having from 5 to 18 carbon atoms per molecule, and petroleum waxes, which may contain $C_{18}$ and heavier compounds.

Alcohols suitable for use in the present invention are the secondary alcohols of the compounds discussed above. Suitable alcohols, are, for instance, isopropyl alcohol, 2-butanol, 3-heptanol, secondary hexadecanol, cyclohexanol, and the like.

Particularly preferred feed stocks for the present invention are cyclopentane and cyclohexane. These compounds are commercially available and are convertible by the present invention in good yield into the corresponding methylol derivatives.

Among the preferred feed stocks are petroleum waxes, e. g. paraffin waxes which consist mainly of molecules containing from about 18 to 30 or more carbon atoms in a chain, and predominantly of normal and very slightly branched paraffins, e. g. having no more than one or two methyl substituents per molecule. By reacting waxy compounds or petroleum waxes with formaldehyde in accordance with the present invention, a mixture of methylol derivatives thereof is obtained which contains one or several methylol groups, spaced along the chain. To produce compounds characterized by highly paraffinic characteristics but low melting points, suitable, i. e., for motor lubricants, the methylol derivatives are converted to the corresponding saturated hydrocarbons. For example, the methylol derivatives of the paraffins may be dehydrated under known conditions, e. g. by contact at elevated temperature with alumina, to form the corresponding olefinic compounds and these olefins then hydrogenated under known conditions, e. g. by contact with nickel or platinum in the presence of hydrogen. It may also be possible to convert the alcohols directly to the corresponding paraffins by hydrogenolysis.

The only aldehyde which has been found to enter into the reaction with saturated compounds according to the present invention is formaldehyde. It can be employed as monomeric formaldehyde or in the form of a compound which liberates formaldehyde under the reaction conditions employed. Paraformaldehyde, a non-cyclic formaldehyde polymer of the formula $(HCHO)_n$, where $n$ is an integer other than 1, is a suitable reaction material. Formalin, a commercial aqueous formaldehyde containing about 37 weight percent HCHO, with up to 12 weight percent methanol, is also a suitable source of formaldehyde. The methanol does not enter into the present reaction.

For liquid phase operation, the peroxidic compound employed should be soluble at least in part in the organic liquid phase, and should preferably be completely soluble in that phase.

Organic peroxides are particularly suitable. Illustrative organic peroxides are tertiary alkyl peroxides, such as ditertiarybutyl peroxide, ditertiaryamyl peroxide, tertiarybutyl tertiaryamyl peroxide, tertiarybutyl tertiaryhexyl peroxide, 2,2-bis(tertiarybutylperoxy)butane, 2,2-bis(tertiarybutyl-peroxy)propane, methyl tertiarybutyl peroxide, ethyl tertiaryamyl peroxide, isopropyl tertiaryamyl peroxide and n-butyl tertiarybutyl peroxide; tertiary alkyl esters of per-acids, such as tertiarybutyl perbenzoate, tertiaryamyl perfuroate, tertiarybutyl peracetate, tertiarybutyl perstearate, tertiarybutyl perundecylenate, tertiarybutyl percrotonate, ditertiarybutyl dipersuccinate, ditertiarybutyl diperoxalate, ditertiarybutyl dipermalonate, ditertiarybutyl diperphthalate, and ditertiarybutyl diperadipate. Peroxides which contain other than a tertiary alkyl group linked to the peroxy group may be employed, such as diacyl peroxides, e. g., dibenzoyl peroxide, diacetyl peroxide, acetyl benzoyl peroxide; normal and secondary alkyl peroxides, such as diethyl peroxide and diisopropyl peroxide.

Hydroperoxides which are predominantly oil-soluble can also be employed. Such hydroperoxides are, e. g., tertiarybutyl hydroperoxide, tertiaryamyl hydroperoxide, and triphenylmethyl hydroperoxide.

The ratio in which the reactants are employed in the present invention may vary over a wide range. From 0.2 to 50 moles of the organic compound to be converted are suitably employed per mole of formaldehyde, and preferably from 5 to 25 moles of the compound per mole of formaldehyde. The formaldehyde is often the more expensive reagent and a high utilization of formaldehyde is in such cases desirable for economic reasons. In order to achieve this, a high ratio of the saturated compound to be converted to formaldehyde is preferred. Although the ratio is conveniently expressed in moles per mole, the essential factor is the number of

groups available per mole of formaldehyde. This ratio is desirably at least 6:1 to insure high formaldehyde utilization. For example, 1 mole of cyclohexane per mole of formaldehyde provides a ratio of 6:1; similarly, 1 mole of n-octane, ½ mole of tetradecane, or ¼ mole of n—$C_{26}$ paraffin, etc., to 1 mole of formaldehyde. If it is desired to produce a substantial proportion of product having more than one methylol group per molecule the ratio of the charge compound to formaldehyde is held in the lower part of the range, e. g. between 0.2 and 1.

The amount of peroxide employed should be in the range from 0.01 to 0.4 mole per mole of formaldehyde, and preferably between 0.05 and 0.1 mole per mole of formaldehyde.

The liquid phase reaction according to the present invention is carried out at temperatures in the range between 60° and 200° C. The lowest temperature suitable for any particular reaction system is detemined by the decomposition temperature of the peroxide employed. The reaction temperature is preferably chosen such that one-half of the amount of the peroxide is decomposed at that temperature in a time between 0.5 and 6 hours. It may thus be said that the reaction temperature should be chosen such that the half-life of the peroxide at that temperature is between 0.5 and 6 hours. Reaction temperatures in the lowest part of the range may be employed with the system in which gaseous formaldehyde is added to the organic phase containing lauroyl peroxide. It is generally preferred to employ reaction temperatures in the range between 120° and 155° C. Such temperatures are suitable, for instance, when ditertiarybutyl peroxide is employed and the system comprises two liquid phases. In vapor phase operation, higher temperatures up to and exceeding 200° C. are preferred.

The time required for carrying out the reaction of the present invention is best stated in terms of the half-life of the peroxide. It is desirable to maintain the reactants in contact for a period of at least about 2, and preferably about 3 half-lives of the peroxide. A half-life of about 2 to 4 hours is generally preferred and the total reaction time is therefore preferably between 6 and 12 hours. The time may suitably be varied within the range from 2 to 24 hours. In vapor phase operation, higher temperatures, hence shorter half-lives and shorter contact times, as low as 10 seconds to 1 minute, may be preferred.

In liquid phase operation, the pressure employed in the reaction of the present invention is that which is sufficient to maintain the reactants in liquid phase and to keep the formaldehyde dissolved. At the higher temperatures, pressures range up to 500 pounds per square inch. Higher pressures may, however, be employed. At the preferred temperatures the pressure may run between 150 and 250 pounds per square inch. In vapor phase operation, atmospheric pressure may suitably be employed.

It has been found that the reaction of the present invention can be suitably carried out in a batch system in a stirred, or otherwise agitated, heated autoclave in which there is placed the required amount of the organic compound to be converted and of aqueous formaldehyde, e. g. formalin. The materials may be added as liquids. The required amount of the peroxide can be added by dissolving it in the organic liquid layer. The autoclave is closed and heated, sufficient pressure being developed to maintain the system in liquid phase. The mixture is agitated by a stirrer or by shaking the autoclave for the required time. An alternative method of operating is to maintain only a liquid organic phase in the reactor and to add gaseous formaldehyde over a perod of time. Instead of being added at the start, the peroxide can be added at periodic intervals or continuously while the reaction is in progress. Although the batch reaction method described has been found suitable, the reaction may also be carried out continuously by maintaining the reactor filled with sufficient reaction mixture to give the desired hold-up time and continuously adding fresh reactants and withdrawing a small amount of the reaction mixture to be worked up as products, and, if desired, returning some recovered reactant components back to the reaction mixture.

The desired alcohols can be recovered from the total reaction mixture obtained in the present reaction by separating the aqueous and organic phase if both phases are present, drying the organic phase, e. g. by use of a suitable drying agent such as anhydrous $Na_2SO_4$, removing unconverted charge organic compound from the organic phase by fractional distillation as overhead, recovering the desired product as a heart cut from the distillation, and separating as a bottoms fraction compounds having more than one methylol group added and aldehyde polymer. The aqueous phase may be discarded. In some cases the aqueous phase may contain a sufficiently high concentration of formaldehyde to be suitable for re-use as aldehyde-containing feed. The aqueous phase may also be worked up for recovery of alcoholic product therefrom. One method of carrying out a complete product work up is described in Example I.

*Example I*

In a stirred stainless steel mixer were placed 484 g. (2.14 moles) of cetane, 7.3 g. (0.05 mole) of di-tert-butyl peroxide, 40.5 g. (0.5 mole) of commercial formalin (37%) and 38 ml. of ethanol. The reaction mixture was stirred and heated to a temperature of 131–135° C. for a total of fifteen hours.

After cooling, the aqueous phase was separated from the organic phase. An equal volume of water was added to the aqueous solution along with 3 drops of concentrated hydrochloric acid. The solution was then concentrated by distillation at atmospheric pressure, until only 25 ml. of solution remained.

Cetane was removed from the organic phase by distillation, 435 grams being recovered. The bottoms were combined with the bottoms from the aqueous phase, and 10 ml. of water and 0.5 ml. of concentrated hydrochloric acid were added. The mixture was put into solution in 200 ml. of dioxane and heated to reflux for 6 hours. After cooling, the solution was poured into water, separated and dissolved in ether. The solution was then washed with aqueous sodium bisulfite and with water, dried over anhydrous magnesium sulfate, and the ether was removed. The product was distilled in vacuo, a middle cut being taken boiling at 144–147° C. and 1 mm. pressure. This fraction, amounting to 3.5 g., analyzed for 0.408 equivalent of alcoholic hydroxyl per 100 g. Theoretical for $C_{17}$ alcohol is 0.39 eq./100 g.

This example represents a modification of the general procedure in that ethanol was added to the initial reactor charge to provide a means for facilitating mutual contact between the aqueous and the organic liquid phase. Separate phases, however, were present in the reactor. Although the ethanol has some beneficial effect, it may be omitted without substantially affecting the yield obtained in the example.

*Example II*

One gram mole of cyclohexane and formalin (37%) equivalent to 0.25 gram mole of formaldehyde, together with 0.1 gram mole of di-tert.-butyl peroxide, were placed in a sealed vessel and the mixture heated at a temperature of approximately 135° C. for a period of 12 hours. The reaction mixture was then separated and analyzed. It was found that 17.5% of the total cyclohexane and 96% of the total formaldehyde had been converted and that the product contained cyclohexyl carbinol in the amount of 38%, based on the formaldehyde reacted or 52%, based on the cyclohexane reacted.

In a similar run, 1 gram mole of cyclohexane was reacted with 1 gram mole of formalin and 0.1 gram mole of di-tert.-butyl peroxide. 30% of the cyclohexane was converted, the product containing 32% of total alcohols, predominantly cyclohexyl carbinol.

*Example III*

Under conditions substantially like those of Example II, 1 gram mole of cyclohexane was reacted with 0.5 gram mole of paraformaldehyde in water in the presence of 0.05 gram mole of di-tert.-butyl peroxide. Formaldehyde conversion was 100%. A yield of 21% of cyclohexyl carbinol, based on total conversion of formaldehyde, was identified.

*Example IV*

Under conditions substantially like those of Example II, 2 gram moles of n-hexane were reacted with 2 gram moles of 37% formalin in the presence of 0.2 gram mole of di-tert.-butyl peroxide. Sixteen percent of the n-hexane and 90% of the formaldehyde were converted. A yield of mixed alcohols was produced to the extent of 16%, based on the formaldehyde, and 91% based on the hexane converted.

*Example V*

Under conditions similar to those in Example II, 0.245 gram mole of nonacosane ($C_{29}H_{40}$) was reacted with 1 gram mole of 37% formalin in the presence of 0.1 gram mole of di-tert.-butyl peroxide. Thirty percent of the hydrocarbon was converted and a yield of 20% of mixed alcohols, based on the 100% conversion of formaldehyde, was recovered.

*Example VI*

Octadecane and formalin (37%) in equimolar ratio were reacted with 0.1 equivalent of di-tert.-butyl peroxide under conditions corresponding to those in Example II. It was found that 99% of the formaldehyde and 22.3% of the hydrocarbon were converted and a 27% yield of alcohols, based on formaldehyde reacted, was recovered. The product container 121% of OH groups, based on octadecane converted, indicating the introduction of more than one methylol group into at least some of the hydrocarbon molecules.

*Example VII*

Under conditions similar to Example II, 5 gram moles of cyclopentane and 1 gram mole of 37% formalin were allowed to react at 145° C. for 2 hours with 0.05 gram mole of di-tert.-butyl peroxide. Converted were 0.93 gram mole of formaldehyde and 0.52 gram mole of cyclopentane. The yield of cyclopentyl carbinol was 23%, based on formaldehyde and 41% based on cyclopentane.

*Example VIII*

147 grams of reaction product between nonacosane and formaldehyde, produced according to Example V, was passed through a quartz tube packed with alumina, at a temperature between 435° and 450° C. 87.1 grams of hydrocarbon product was recovered which was semi-solid at 0° C. This product was hydrogenated over Raney nickel. The hydrogenated product was then de-waxed in methyl ethyl ketone at −30° C. and topped to remove all material boiling below 150° C. at 2 mm. 45.5 grams froze out at −30°. 10.8 grams of liquid so recovered was passed over silica gel to remove traces of carbonyl- and hydroxyl-containing compounds. The resulting hydrocarbon oil had a viscosity index of 140. There was indication that a small amount of cracking had taken place during the dehydration step.

*Example IX*

Gaseous formaldehyde was bubbled into a solution of 0.038 gram mole of lauroyl peroxide in 2.67 gram moles of cyclohexane, under reflux conditions. 5.5 grams of cyclohexyl carbinol was produced.

*Example X*

Under conditions similar to Example II, 1 gram mole of 37% aqueous formalin was caused to react with 5 gram moles of methylcyclopentane and 0.05 gram mole of di-tert.-butyl peroxide at 150° C. for 2 hours. The mixture was separated and 10 grams of mixed alcohols were obtained boiling at 80–85° C. (20 mm.). This product represents a yield of 8.8% based on total converted formaldehyde and 19.5% based on recovered methyl cyclopentane.

From a study of the product it is estimated that about 22% of the formaldehyde added to methyl cyclopentane at the tertiary carbon atom.

We claim as our invention:

1. The method of adding at least one methylol group to a saturated compound having at least 3 carbon atoms which comprises heating together at a temperature in the range of from 60° to 200° C., (1) an aqueous liquid phase containing, at the reaction conditions, formaldehyde, and (2) an organic liquid phase containing from 0.01 to 0.4 moles of an organic peroxidic compound per mole of formaldehyde and a saturated organic compound containing at least one group

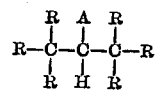

wherein each R represents a member of the group consisting of hydrogen and non-aromatic hydrocarbyl radicals and A represents a member of the group consisting of hydrogen and alkyl radicals, to form a corresponding compound in which the hydrogen attached to the carbon to which substituent A is attached, is replaced by —$CH_2OH$.

2. The method according to claim 1 in which said saturated compound is a paraffin.

3. The method according to claim 1 in which said saturated compound is a cycloparaffin.

4. The method according to claim 3 in which said cycloparaffin is cyclohexane.

References Cited in the file of this patent

UNITED STATES PATENTS 2,011,199     Pelc _____ Aug. 13, 1935
2,726,255     Walker _____ Dec. 6, 1955